United States Patent [19]
Galko et al.

[11] Patent Number: 5,895,807
[45] Date of Patent: Apr. 20, 1999

[54] PROCESS FOR MANUFACTURING POLYESTER COPOLYMERS

[75] Inventors: Joseph Galko; Douglas David Callander, both of Akron, Ohio; Eugene John Burkett, Scott Depot, W. Va.; Edwin Andrew Sisson, Akron, Ohio

[73] Assignee: Shell Oil Company, Houston, Tex.

[21] Appl. No.: 08/974,612

[22] Filed: Nov. 19, 1997

[51] Int. Cl.⁶ .................... C08F 20/00; C08G 63/02
[52] U.S. Cl. .................... 525/444; 528/272; 528/274; 528/275; 528/298; 528/302; 528/307; 528/308; 528/308.6; 525/437
[58] Field of Search .................... 528/272, 274, 528/275, 298, 302, 307, 308, 308.6; 525/437, 444

[56] References Cited

U.S. PATENT DOCUMENTS

| | | | |
|---|---|---|---|
| 4,020,049 | 4/1977 | Rinehart | 528/274 |
| 5,331,082 | 7/1994 | Mossman et al. | 528/298 |
| 5,594,092 | 1/1997 | Burkett et al. | 528/272 |

*Primary Examiner*—Samuel A. Acquah

[57] ABSTRACT

A process for making a random polyalkylene terephthalate/naphthalate copolymer by synthesizing a bis-(hydroxyalkyl)-naphthalate composition under transesterification conditions, and subsequently combining the bis-(hydroxyalkyl)-naphthalate, a terephthalic acid, and an alkylene glycol under direct esterification conditions to form a random polyaklylene terephthalate/naphthalate copolymer. The preferred bis-(hydroxyalkyl)-naphthalate is bis-(2-hydroxyalkyl)-2,6-naphthalate, with bis-(2-hydroxyethyl)-2,6-naphthalate being the most preferred. Preferably, the bis-(hydroxyalkyl)-naphthalate is added at the initial stage of an acid-based polymer process, and polymerization is initiated or continued to produce a polyester copolymer. Alternatively, the bis-(hydroxyalkyl)-naphthalate is added to phthalate-based oligomers after the initial direct esterification stage, and polymerization is continued to produce a polyester copolymer.

21 Claims, No Drawings

PROCESS FOR MANUFACTURING POLYESTER COPOLYMERS

FIELD OF THE INVENTION

This invention relates to a process for manufacturing a linear random polyester copolymer. More particularly, this invention relates to a process for manufacturing a polyethylene terephthalate/naphthalate, or PET/N copolymer.

BACKGROUND OF THE INVENTION

As known to those skilled in the art, linear polyesters are generally made in two stages. In the first stage, called the esterification or transesterification stage, a dicarboxylic acid or diester is reacted with a diol at elevated temperatures and at either atmospheric or elevated pressures. In this first stage water or the corresponding alcohol is produced as a byproduct. In the second stage, also known as the polycondensation stage, a vacuum is gradually applied in the presence of one or more catalysts, liberating water along with excess diol as condensation byproducts. This two-stage process is generally conducted in the melt phase, until the intrinsic viscosity of the polymer reaches about 0.2 dl/g or higher, for example, up to about 0.6 dl/g. At this point, the molten polymer is rapidly cooled to produce a solid polymer which is then pelletized or chopped. Various polyesters can be made by such polymerization techniques, including polyethylene terephthalate (PET), and various copolymers thereof.

To produce crystallizable copolymers with high molecular weights and high melting points, such as those suitable for use as bottle resins, the pelletized product of the melt phase process is subsequently subjected to solid state polymerization at a temperature below the melting point of the partially formed polymer, and in the presence of a vacuum or a nitrogen purge to remove reaction byproducts. The polymer is actually polymerized in a solid state, with the the polycondensation reaction being continued in such a state. Solid state polymerization is continued until the intrinsic viscosity of the polymer reaches any desired level, such as from about 0.6 dl/g to about 1.0 dl/g or even higher. Desirably, the intrinsic viscosity ranges from about 0.70 dl/g to about 0.90 dl/g.

Two major commercial processes are used to produce high molecular weight linear polyesters. These two processes are the ester-based process and the acid-based process, which react a diester and a diacid, respectively, with one or more diols. For example, in the production of high molecular weight polyethylene terephthalate, the dimethyl ester of terephthalic acid is heated with an excess of ethylene glycol in the presence of a transesterification catalyst at a temperature of about 185° C. to about 220° C. under atmospheric pressure until approximately the theoretical amount of methyl alcohol has been liberated. The excess glycol is then distilled off and the remaining product, a bis glycol ester, is polymerized by condensation. Glycol is eliminated by heating the bis glycol ester with a catalyst at elevated temperatures and under reduced pressures until a high molecular weight product is formed.

High molecular weight polyesters can also be produced on a commercial scale by an acid-based process, which is a direct esterification process. Polyethylene terephthalate, for example, can be produced by heating terephthalic acid with ethylene glycol to form a mixture of low molecular weight oligomers, which can then be polycondensed by heating in the presence of a catalyst at a temperature of about 260° C. to about 300° C. under reduced pressures to form a high molecular weight product. The acid-based process is currently preferred for commercial operations.

The acid-based process has many advantages, both technical and economics. The free acids are less expensive than dialkyl esters of acids. There is no lower alkyl alcohol byproduct, and since the excess of diol used is kept at a minimum, recovery and losses of diol are considerably reduced. No transesterification catalyst is required. The reaction rates are rapid and complete reaction from raw material to high polymer may be carried out in as little as three hours. Furthermore, polyesters formed by this method may attain intrinsic viscosities which are somewhat higher than those normally obtained by the ester interchange route. In addition to these advantages, the polyester product may contain less catalyst residue than polyester resin formed by the ester-based process. Although no catalyst is necessary at the initial stage of an ester based process, a catalyst such as zinc acetate, manganese acetate, or alkali metal alcoholates is typically employed as a transesterification catalyst. The only catalyst actually necessary is a condensation catalyst, which may suitably be antimony trioxide, zinc borate, litharge, lead acetate, magnesium oxide, or other condensation catalyst.

Polyester copolymers are generally prepared by combining one or more dicarboxylic acids with one or more diols, or by combining one or more diesters of dicarboxylic acids with one or more diols. A polyethylene terephthalate/naphthalate copolymer, for example, may be made by combining dimethyl terephthalate, dimethyl-2,6-naphthalene-dicarboxylate, and ethylene glycol. It is desirable to prepare such copolymers through a combination of terephthalic acid, 2,6-naphthalene dicarboxylic acid, and ethylene glycol. However, 2,6-naphthalene dicarboxylic acid, with a purity sufficient to produce high molecular weight polyester, is not currently commercially available, while its diester equivalent, dimethyl-2,6-naphthalene-dicarboxylate, is commercially available. Consequently, manufacturers that employ an ester-based process can more readily make a polyester copolymer containing both phthalate-based units and naphthalate-based units.

The conventional ester-based process to make polyethylene naphthalate (PEN) polymers employs dimethyl-2,6-naphthalene-dicarboxylate, ethylene glycol, and a catalyst, such as a manganese catalyst in the transesterification step. The presence of acidic impurities, such as the presence of terephthalic acid, would poison the catalyst, significantly reducing its activity. Thus, the presence of an acidic component would inhibit the formation of, for example, bis-(2-hydroxy-ethyl)-2,6-naphthalate, the transesterification product of dimethyl-2,6-naphthalene-dicarboxylate and ethylene glycol. It is important that all the methyl groups of dimethyl-2,6-naphthalene-dicarboxylate are completely exchanged with hydroxyethyl groups, since any residual methyl end groups will not be removed during the subsequent polycondensation reaction and will act as "dead ends" on the polymer chains, thus limiting the attainable molecular weight and rate of the melt and solid state polymerization steps.

This problem was solved by combining the product of the ester-based process with the product of the acid-based process to form a polyester copolymer as described in U.S. Pat. No. 5,594,092. More specifically, this patent describes the manufacture of a polyester phthalate/naphthalate copolymer by combining a low molecular weight naphthalate-based polymer with the acid based monomers used to make a phthalate-based polymer and/or with a phthalate-based oligomers, either at the initial stage of an acid-based polymer process, or at the second condensation stage of the acid based process.

The addition of the low molecular weight naphthalate-based polymer to the acid based process was accomplished by cooling and pelletizing the naphthalate-based polymer. To avoid making a polymer that is brittle and which shatters upon pelletizing, the reaction was carried out to make a polymer with a minimum molecular weight and intrinsic viscosity. In particular, U.S. Pat. No. 5,594,092 directs one to make a low molecular weight naphthalate-based polymer having a degree of polymerization from about 20 to 100, a number average molecular weight from about 4800 to about 24,200, and an intrinsic viscosity from about 0.15 to about 0.45 dl/g.

It would be desirable, however, to avoid manufacturing this low molecular weight naphthalate-based polymer. To make the low molecular weight naphthalate polymer, a second polycondensation stage is required whereby slightly higher temperatures are employed over the temperatures employed in the initial first stage of the reaction, vacuum is gradually applied, and a polycondensation catalyst must be added in addition to the transesterification catalyst used at the initial stage. This results in additional processing, time, equipment, and ingredients. Further, once the low molecular weight naphthalate-based polymer is added to the acid based process, the process relies upon transesterification reactions to break down the molecular weight of the naphthalate-based polymer chain and distribute the smaller chains randomly across the PET polymer as it is polymerizing. In spite of the breakdown of the polymer into smaller chain molecules, the smaller chains usually contain a number of repeated -naphthalate-glycol- bonds. It would be desirable to add an ingredient to the acid based reactants which closely approximates a reactive monomer unit in order to obtain a larger number of-phthalate-naphthalate- linkages randomly distributed throughout the polymer.

SUMMARY OF THE INVENTION

There is now provided a process for making a random polyalkylene terephthalate/naphthalate copolymer comprising synthesizing a bis-(hydroxyalkyl)-naphthalate composition under transesterification conditions, and subsequently combining said bis-(hydroxyalkyl)-naphthalate, a terephthalic acid, and an alkylene glycol under direct esterification conditions to form a random polyaklylene terephthalate/naphthalate copolymer. The preferred bis-(hydroxyalkyl)-naphthalate is bis-(2-hydroxyalkyl)-2,6-naphthalate, with bis-(2-hydroxyethyl)-2,6-naphthalate being the most preferred.

Preferably, the bis-(hydroxyalkyl)-naphthalate is added at the initial stage of an acid-based polymer process, and polymerization is initiated or continued to produce a polyester copolymer. Alternatively, the bis-(hydroxyalkyl)-naphthalate is added to phthalate-based oligomers after the initial direct esterification stage, and polymerization is continued to produce a polyester copolymer. For example, a bis-(hydroxyalkyl)-naphthalate is combined with terephthalic acid and ethylene glycol to form a PET/N copolymer. As an alternative, the bis-(hydroxyalkyl)-naphthalate is added to PET oligomers, and polymerization is continued to produce a PET/N copolymer.

DETAILED DESCRIPTION OF THE INVENTION

The molecular weight of a polymer is a measure of the average weight of the molecular chains in the mixture of different-sized molecular chains that make up the polymer. The number average molecular weight is based upon the sum of the number fractions for the weight of each size of molecular chain present in the polymer. The number average molecular weight for the polymers of the invention may be determined by end-group titration or gel-permeation chromatography, using conventional methods. Unlike the low molecular weight naphthalate-based polymer described in U.S. Pat. No. 5,594,092, the bis-(hydroxyalkyl)-naphthalate composition used in the invention has a number average molecular weight of less than 500, preferably less than 400, more preferably less than 350. The ideal composition would have the theoretical molecular weight of the two monomers transesterified, such as 304 in the case of bis-(2-hydroxyethyl)-2,6-naphthalate. However, in most commercial processes, a small number of the bis-(hydroxyalkyl)-naphthalate molecules may oligomerize to form a 2 or 3 or higher chain of the monomers. Consequently, the bis-(2-hydroxyethyl)-2,6-naphthalate composition, for example, will typically have a number average molecular weight higher than 304, but not exceeding 400.

The degree of polymerization should ideally be reduced in order to maximize the number bis-(hydroxyalkyl)-naphthalate molecules in the composition. The degree of polymerization is related to the molecular weight, and refers to the number of monomer molecules that combine to form a single polymer molecule. The degree of polymerization is estimated by dividing the number average molecular weight of the polymer by the molecular weight of the polymer repeat unit. The degree of polymerization of the bis-(hydroxyalkyl)-naphthalate composition is generally about 2.0 or less, more preferably 1.4 or less, and optimally about 1 to 1.2. While the reaction conditions and ratios may optimally be set for a degree of polymerization of 1, it is often the case that small number of the molecules will oligomerize during the reaction on an industrial scale.

Another feature of the bis-(hydroxyalkyl)-naphthalate composition used in the process of the invention is that its intrinsic viscosity is typically quite low, less than 0.10 dl/g. Intrinsic viscosity is frequently utilized as an indication of the molecular weight of polyester polymers. The intrinsic viscosity of a polymer is determined by plotting the reduced or inherent viscosity of a series of polymer solutions with various polymer concentrations against the polymer concentration in the various solutions. Extrapolation of the plot to zero concentration yields the intrinsic viscosity of the polymer. For purposes of this invention, intrinsic viscosity (measured in dl/g) is determined in a 60:40 phenol:tetrachloroethane mixed solvent solution at 30° C.

The bis-(hydroxyalkyl)-naphthalate may be manufactured by combining a dialkyl ester of a naphthalate with a alkylene glycol under transesterification conditions in the presence of a transesterification catalyst which is deactivated upon completion of the reaction.

Representative examples of the naphthalate diesters used to make the bis-(hydroxyalkyl)-naphthalate are the alkyl diesters of the naphthalene dicarboxylic acids which include 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid and 2,7-naphthalene dicarboxylic acid. Preferably, the alkyl radicals bonded to the oxygen atoms of the diester molecule contain 1 to 6 carbon atoms. Such alkyl radicals may be the same or different, and may be linear or branched. Suitable alkyl radicals include methyl, ethyl, propyl, isopropyl, n-butyl, iso-butyl, tertbutyl, n-pentyl, and n-hexyl. Diesters of 2,6-naphthalene dicarboxylic acid are the preferred esters for use in this invention, and dimethyl-2,6-naphthalene-dicarboxylate is particularly preferred to manufacture the preferred bis-(2-hydroxyalkyl)-2,6-naphthalate.

Representative examples of the alkylene glycols which can be used in this invention are linear and branched alkyl diols having from about 2 to about 10 carbon atoms. Specific examples include ethylene glycol (1,2-ethanediol), propylene glycol, trimethylene glycol (e.g. 1,3-propanediol), butylene glycol (e.g. 1,4-butanediol), and neopentyl glycol. Ethylene glycol, propylene glycol, and butylene glycol are preferred, and ethylene glycol is particularly preferred to make the bis-(2-hydroxyethyl)-2,6-naphthalate. Optionally, minor amounts of other low molecular weight polyols can be added, such as glycerine, trimethlyol propane, sucrose, or polyoxyalkylene polyether polyols having a molecular weight of less than 400.

The molar ratio of the dialkyl ester of naphthalate to the alkylene glycol ranges from 1:1.05 to 1:3, preferably from 1:2 to 1:2.5. It is desirable to have a double molar excess of glycol to ensure that the naphthalate is transesterified at each functional site.

Suitable transesterification catalysts include metallic compounds of Co, Ca, Mg, Mn, Zn, Sn, Ti, etc in the form off oxides, hydroxides, halides, inorganic acid salts or organic acid salts.

The naphthalate dialkyl ester, the alkylene glycol, and the catalyst may be weighed into a batch reactor or may be metered into a continuous process for making the bis-(hydroxyalkyl)-naphthalate. The most common method is to add the ingredients to a batch reactor. The temperature used for the transesterification reactions is from about 150° C. to about 300° C., depending upon the monomer units present, but is usually operated in the range of from about 200° C. to about 280° C. The pressure used for the transesterification reactions will vary with the temperature used, and generally will be at least as high as the vapor pressure of the most volatile glycol in the reaction mixture at the temperature used. The pressure used will be less than the vapor pressure of water at the temperature at which the reaction is occurring. Thus the pressure can suitably be from about 20 to about 1000 pounds per square inch gauge (psig) and is preferably operated in the range of from about 30 to about 100 psig.

During the course of the reaction, it is desirable to agitate the ingredients. The reaction may take from ½ hour to 5 hours to complete the manufacture of the bis-(hydroxyalkyl)-naphthalate. The byproduct formed from the transesterification reaction, the alcohol such as methanol where the naphthalate used was a dimethyl naphthalate, may be collected as the reaction proceeds to drive the equilibrium toward formation of the bis-(hydroxyalkyl)-naphthalate. Excess glycol may be collected under vacuum or allowed to remain in the composition as a monomer used in the acid based direct esterification step. Upon completing the reaction, the transesterification catalyst may be deactivated.

Once the bis-(hydroxyalkyl)-naphthalate is made, it may be immediately transferred to a second reaction zone which supports the acid based process, also commonly known as direct esterification. Alternatively, the bis-(hydroxyalkyl)-naphthalate batch may be stored for later use. The bis-(hydroxyalkyl)-naphthalate remains molten during the transesterification process, typically ranging from 200–250° C. (depending on the amount of excess ethylene glycol contained in the bis-(hydroxyalkyl-naphthalate). Accordingly, there is no need to employ the additional step of solidifying and pelletizing for storage. In a continuous process, the bis-(hydroxyalkyl)-naphthalate may be withdrawn as manufactured and continuously fed to the direct esterification reaction zone.

The amount of bis-(hydroxyalkyl)-naphthalate added to the direct esterification reaction zone depends upon the desired amount of naphthalenic moieties in the polyester copolymer. A PET/N copolymer containing carboxylate monomer units that are from 85 mole percent to 99 mole percent terephthalate-based and 15 mole percent to 1 mole percent naphthalate-based is preferred, with from greater than 90 mole percent to 98 mole percent terephthalate-based and less than 10 mole percent to 2 mole percent naphthalate-based being more preferred, with from about 95 mole percent to 98 mole percent terephthalate-based and about 5 mole percent to 2 mole percent naphthalate-based being most preferred, each based on total moles of carboxylate units. These ranges define compositions that are crystallizable and yield improved strength on orientation at temperatures above the glass transition temperature of the composition.

In one embodiment, the bis-(hydroxyalkyl)-naphthalate composition is combined with an aromatic or aliphatic dicarboxylic acid and an alkylene glycol in an acid based process under direct esterification conditions to make the random copolymer of PET/N.

Representative examples of acids which can be used in the direct esterification stage of the acid based process are aromatic or aliphatic dicarboxylic acids having from about 2 to about 32 carbon atoms. Specific examples of aliphatic dicarboxylic acids include oxalic acid, malonic acid, succinic acid, glutaric acid, adipic acid, pimelic acid, suberic acid, azelaic acid, sebacic acid, and the like. Preferably, the acids are aromatic acids or alkyl-substituted aromatic acids containing from about 8 to about 16 carbon atoms. Specific examples of such aromatic acids include the various isomers of phthalic acid (orthophthalic acid, metaphthalic or isophthalic acid, and paraphthalic or terephthalic acid), and the various isomers of dimethylphthalic acid (dimethylisophthalic acid, dimethylorthophthalic acid, and dimethylterephthalic acid). Naphthalic acids are specifically excluded, since the naphthalate-based component of the polymers of the invention is provided in the form of the bis-(hydroxyalkyl)-naphthalate. Terephthalic and isophthalic acid are the preferred acids, and a combination of terephthalic acid and isophthalic acid, wherein isophthalic acid is a minor acid component, is particularly preferred.

The alkylene glycol employed can be any one of those mentioned above with respect to the manufacture of the bis-(hydroxyalkyl)-naphthalate.

The operating conditions for the acid-based polymerization processes described herein are generally known to those skilled in the art of preparing polyester polymers and copolymers. The temperature used in the acid based process is from about 250° C. to about 295° C., depending upon the monomer units present, and is preferably operated in the range of 265° C. to 285° C. The pressure used for the polycondensation reaction is gradually reduced-over the course of the reaction, from atmospheric pressure to a high vacuum of less than 1 torr. The reaction employs a polycondensation catalyst, which may suitably be antimony trioxide, antimony triacetate, antimony glycolate, zinc borate, litharge, lead acetate, magnesium oxide, or the like.

In another embodiment, the bis-(hydroxyalkyl)-naphthalate composition is combined with polyethylene terephthalate (PET) oligomers under transesterification conditions. The transesterification conditions are also known to those in the art and are described above with respect to transesterifying the dialkyl naphthalate with the alkylene glycol with a transesterification catalyst. In this embodiment, an aromatic dicarboxylic acid and an alkylene glycol are combined in an acid-based process to manufacture, for example, a phthalate-based product, preferably phthalate-based oligomers with a degree of polymerization of from 1.4 to 10 and preferably 1.6 to 5. The phthalate-based oligomers have both acid and hydroxyl ends on the oligomer chains. Separately, the alkyl diester of a naphthalene dicarboxylic acid and an alkylene glycol are combined in a transesterification process to manufacture a bis-(hydroxyalkyl)-naphthalate composition. The bis-(hydroxyalkyl)-naphthalate composition is combined with the phthalate-based product in the acid-based process, where direct esterification and transesterification reactions occur to form a random polyester copolymer.

In this embodiment, it is preferable to combine terephthalic acid and ethylene glycol in the acid-based process to produce PET oligomers. Such PET oligomers have a degree of polymerization of from about 1.4 to 10 monomer units, and preferably 1.4 to 5 monomer units, and a number average molecular weight of from about 300 to about 2000, and preferably from about 300 to about 1000. Separately, preferably dimethyl-2,6-naphthalene-dicarboxylate and ethylene glycol are combined in a transesterification process, resulting in a bis-(2-hydroxyethyl)-2,6-naphthalate composition. The bis-(2-hydroxyalkyl)-2,6-naphthalate is then added to the PET oligomers in the acid-based process, where esterification and ester interchange reactions and further polymerization result in a random PET/N copolymer.

The acid-based process for polymerization is preferably carried out with the use of a "heel." The heel is an esterification product recycled to the initial stages of the esterification reaction to increase the solubility of the dicarboxylic acid, thereby increasing the reaction rate of the dicarboxylic acid and the diol. The use of a heel is explained in U.S. Pat. No. 4,020,049 (Rinehart), and may be applied to both continuous and batch manufacturing processes.

In this invention, a heel is optionally but advantageously used in either of the two embodiments described above. For example, when terephthalic acid, ethylene glycol, and the bis-(hydroxyalkyl)-naphthalate composition are combined in the acid-based polymer process, the reactor in which these materials are combined may contain a heel of preformed PET oligomers to facilitate dissolution of the terephthalic acid. Also, for example, when terephthalic acid and ethylene glycol are combined to form the PET oligomers, the reactor in which these materials are combined may contain a heel of preformed PET oligomers.

The molecular weight of the copolymers produced by the process of this invention may be increased by polymerization in the solid state. The solid state polycondensation reaction is conducted at temperatures from about 1 90° C. to about 250° C., in the presence of an inert gas (e.g. nitrogen). The inert gas serves to remove reaction byproducts, such as excess diol and water. The solid state polymerization reaction is generally continued until the polymer reaches an intrinsic viscosity of 0.7 dl/g or more.

The polyester copolymer produced in the melt polymerization process preferably contains a carboxyl content that provides an enhanced solid state polymerization rate. A method for producing polyester polymers with an optimum carboxyl content is described in U.S. Pat. No. 4,238,593 (Duh).

Polyester copolymers can be prepared with a wide variety of characteristics which make such polymers useful for a wide variety of applications. A PET/N copolymer, for example, exhibits improved gaseous barrier, greater UV absorption and chemical resistance, and higher temperature properties relative to a PET polymer, yet may be more economic than a PEN homopolymer. Such PET/N copolymers are particularly useful for making fibers, films, and food and beverage packaging articles. "Hot fill"and "returnable, reusable" containers may require the thermal properties of a polyester copolymer such as a PET/N copolymer. Copolymers containing carboxylate monomer units that are from 90 mole percent to 98 mole percent terephthalate-based and less than 10 mole percent to 2 mole percent naphthalate-based, based on total moles of carboxylate units, are particularly useful for such applications.

The process of the invention is illustrated by the following illustrative and comparative examples.

ILLUSTRATIVE EXAMPLE 1

A bis-(2-hydroxyethyl)-2,6-naphthalate composition was prepared in the following manner. An oil-jacketed stainless steel reactor (10 gallon capacity) preheated to 190° C. was charged with 20.2 pounds of dimethyl-2,6-naphthalene-dicarboxylate, 11.3 pounds of ethylene glycol, and a manganese transesterification catalyst. Mechanical agitation was initiated and the reactor oil temperature increased over the next 2.5 hours to 225° C. The transesterification reaction, carried out under atmospheric pressure, was completed in about 3.5 hours, during which time 5.3 pounds of by-product methanol were collected. The transesterification product bis-(2-hydroxyethyl)-2,6-naphthalate had a final temperature of 212° C. 0.08 pounds of a manganese catalyst deactivator/stabilizer formulation was added to deactivate the bis-(2-hydroxyethyl)-2,6-naphthalate. This reaction produced 22 pounds of bis-(2-hydroxyethyl)-2,6-naphthalate composition having an IV of 0.064, a melting point of 1 98° C. Its degree of polymerization was about 2.0 or less, and its number average molecular weight was about 484. This bis-(2-hydroxyethyl)-2,6-naphthalate composition was subsequently used as one of the starting materials for the reactions described in Example 2.

ILLUSTRATIVE EXAMPLE 2

A polyester copolymer containing 95 mole percent terephthalate units and 5 mole percent naphthalate units, based upon total moles of carboxylate units, was prepared in the following manner. An oil-jacketed stainless steel reactor (10 gallon capacity), preheated to 275° C. held about 25 pounds of a PET oligomer "heel" at atmospheric pressure under mechanical agitation. The heel, prepared by reaction of terephthalic acid and ethylene glycol, was utilized to facilitate solubilizing the terephthalic acid. The reactor was charged with 15 pounds of terephthalic acid and 3.4 pounds of the bis-(2-hydroxyethyl)-2,6-naphthalate composition of Example 1. The reactor was then sealed, pressurized to 10 psig with nitrogen gas, and charged with 6.7 pounds of ethylene glycol and an additive formulation. The amount of bis-(2-hydroxyethyl)-2,6-naphthalate added was sufficient to adjust the entire contents of the reactor (the heel as well as the terephthalic acid and ethylene glycol added) to contain 5 mole percent naphthalate, based on total moles of carboxylate units. The reaction pressure was increased to 35 psig.

The total esterification reaction cycle was completed in about 3.5 hours, during which time 3.8 pounds of by-product water were collected. The esterification product had a final temperature of 267° C. Then, 21 pounds of the reactor contents were transferred to a second oil-jacketed stainless steel reactor (10 gallon capacity) preheated to 260° C. While the contents of the second reactor were held at atmospheric pressure under mechanical agitation, an additive formulation and an antimony polycondensation catalyst were added to the reactor. The reactor was then sealed and the pressure reduced at a controlled rate over a period of about 1 hour to about 1.0 torr. The intermediate polycondensation product had a final temperature of 257° C. After increasing the oil temperature to 280° C. and obtaining an ultimate vacuum of about 0.2 torr, the polycondensation was continued for about 1 hour until the agitator torque reached a predetermined target of 1.12 kilowatts at 106 rpm. This final polycondensation product had a final temperature of 265° C. The reactor contents were then extruded through a die to form strands that were cooled in a water bath and pelletized. This reaction produced 20.1 pounds of polyethylene(terephthalate).95 (naphthalate).05 copolymer having the following properties: IV=0.59dl/g, T|m|.=241 C., glass transition temperature= 80° C., and color values L*=70.1 and b*=8.5.

COMPARATIVE EXAMPLE 1

A polyester copolymer containing 95 mole percent terephthalate units and 5 mole percent naphthalate units was prepared in the following manner. An oil-jacketed stainless steel reactor (100 gallon capacity) preheated to 180° C. was charged with 142.1 pounds of dimethyl-terephthalate, 9.4 pounds of dimethyl-2,6-naphthalene-dicarboxylate, 105.2 pounds of ethylene glycol, and a manganese transesterification catalyst. Once the melt temperature reached 140° C., mechanical agitation was initiated. When the melt temperature reached 155° C., the reactor oil temperature was increased at a controlled rate over the next 1.7 hours to 230° C. The transesterification reaction cycle, carded out under atmospheric pressure, was completed in 3.5 hours, during which time 47 pounds of by-product methanol were collected. The transesterification product had a final temperature of 216° C. The reactor contents were then transferred to a second oil-jacketed stainless steel reactor (70 gallon capacity) preheated to 250° C. To the contents of the second reactor, held at atmospheric pressure under mechanical agitation, a stabilizer formulation and an antimony polycondensation catalyst were added. The reactor was then sealed, the oil temperature raised to 275° C., and the pressure reduced at a controlled rate over a period of about 1.6 hours to about 2.7 torr. The intermediate polycondensation product had a final temperature of 254° C. The reactor contents were then transferred to a third oil-jacketed stainless steel reactor (77 gallon capacity) preheated to 280° C. After obtaining an ultimate vacuum of about 0.8 torr, the polycondensation was continued for about 2.0 hours until the agitator torque reached a predetermined target of 2.7 kilowatts at 30 RPM. The final polycondensation product temperature was 280° C. The reactor contents were then extruded through a die to form strands that were cooled in a water bath and pelletized. This reaction produced 152 pounds of polyethylene (terephthalate)0.95(naphthalate)0.05 copolymer having the following properties: IV=0.61 dl/g, $T_m$=248.8° C., $T_g$=82.1° C., and color values $R_d$=28.4 and b=2.9.

While certain representative embodiments and details have been shown for the purpose of illustrating the invention it will be apparent to those skilled in the art that various changes and modifications may be made therein without departing from the spirit or scope of the invention.

We claim:

1. A process for making a random polyalkylene terephthalate/naphthalate copolymer comprising:
   a) synthesizing a bis-(hydroxyalkyl)-naphthalate composition under transesterification conditions; and
   b) combining said bis-(hydroxyalkyl)-naphthalate with:
      i) terephthalic acid and an alkylene glycol under direct esterification conditions effective to form a random polyalkylene terephthalate/naphthalate copolymer; or
      ii) polyethylene terephthalate oligomers and optionally further terephthalic acid and alkylene glycol, under transesterification conditions effective to form a random polyalkylene naphthalate/terephthalate copolymer.

2. The method of claim 1, wherein said bis-(hydroxyalkyl)-naphthalate composition is synthesized in the presence of a transesterification catalyst which is deactivated at the conclusion of the synthesis of the bis-(hydroxyalkyl)-naphthalate composition.

3. The method of claim 1, wherein said bis-(hydroxyalkyl)-naphthalate composition comprises bis-(2-hydroxyalkyl)-2,6-naphthalate.

4. The method of claim 3, wherein said bis-(hydroxyalkyl)-naphthalate composition comprises bis-(2-hydroxyethyl)-2,6-naphthalate.

5. The method of claim 2, wherein said bis-(hydroxyalkyl)-naphthalate composition comprises bis-(2-hydroxyethyl)-2,6-naphthalate.

6. The method of claim 1, wherein said bis-(hydroxyalkyl)-naphthalate is combined with terephthalic acid and an alkylene glycol under direct esterification conditions effective to form a random polyaklylene terephthalate/naphthalate copolymer.

7. The method of claim 1, wherein said bis-(hydroxyalkyl)-naphthalate composition has a number average molecular weight of less than 400.

8. The method of claim 7, wherein the bis-(hydroxyalkyl)-naphthalate composition has a number average molecular weight of less than 350.

9. The method of claim 8, wherein the bis-(hydroxyalkyl)-naphthalate composition has a number average molecular weight of less than 300.

10. The method of claim 1, wherein the degree of polymerization of the bis-(hydroxyalkyl)-naphthalate composition is less than 1.4.

11. The method of claim 10, wherein the degree of polymerization of the bis-(hydroxyalkyl)-naphthalate composition is 1.2 or less.

12. The method of claim 11, wherein the degree of polymerization of the bis-(hydroxyalkyl)-naphthalate composition is about 1 to 1.1.

13. The method of claim 1, wherein the bis-(hydroxyalkyl)-naphthalate composition has an intrinsic viscosity of less than 0.10 dl/g.

14. The method of claim 1, wherein the bis-(hydroxyalkyl)-naphthalate composition is withdrawn as manufactured and continuously fed to a direct esterification reaction zone containing terephthalic acid and alkylene glycol.

15. The method of claim 1, wherein said polyalkylene naphthalate/terephthalate copolymer comprises from 85 mole percent to 99 mole percent terephthalate-based units and 15 mole percent to 1 mole percent naphthalate-based units, based on total moles of carboxylate units.

16. The method of claim 15, wherein said polyalkylene naphthalate/terephthalate copolymer comprises from greater than 90 mole percent to 98 mole percent terephthalate-based units and less than 10 mole percent to 2 mole percent naphthalate-based units, based on total moles of carboxylate units.

17. The method of claim 16, wherein said polyalkylene naphthalate/terephthalate copolymer comprises from about 95 mole percent to 98 mole percent terephthalate-based units and about 5 mole percent to 2 mole percent naphthalate-based units, based on total moles of carboxylate units.

18. The method of claim 1, wherein the bis-(hydroxyalkyl)-naphthalate composition is combined with said bi) or said bii) in the presence of a polyester heel.

19. A random polyalkylene naphthalate/terephthalate copolymer comprising the reaction product of a bis-(hydroxyalkyl)-naphthalate composition and i) terephthalic acid and an alkylene glycol under direct esterification conditions; or ii) polyethylene terephthalate oligomers and optionally further terephthalic acid and alkylene glycol.

20. The random polyalkylene naphthalate/terephthalate copolymer of claim 19, wherein said bis-(hydroxyalkyl)-naphthalate composition comprises bis-(2-hydroxyethyl)-2,6-naphthalate having a number average molecular weight of less than 400.

21. The random polyalkylene naphthalate/terephthalate copolymer of claim 20, comprising from greater than 90 mole percent to 98 mole percent terephthalate-based units and less than 10 mole percent to 2 mole percent naphthalate-based units, based on total moles of carboxylate units, and the degree of polymerization of the bis-(hydroxyalkyl)-naphthalate composition is less than 1.4.

* * * * *